US007837976B2

(12) United States Patent
Sandrock et al.

(10) Patent No.: US 7,837,976 B2
(45) Date of Patent: Nov. 23, 2010

(54) ACTIVATED ALUMINUM HYDRIDE HYDROGEN STORAGE COMPOSITIONS AND USES THEREOF

(75) Inventors: Gary Sandrock, Ringwood, NJ (US); James Reilly, Bellport, NY (US); Jason Graetz, Mastic, NY (US); James E. Wegrzyn, Brookhaven, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 1516 days.

(21) Appl. No.: 11/192,262

(22) Filed: Jul. 29, 2005

(65) Prior Publication Data

US 2007/0025908 A1    Feb. 1, 2007

(51) Int. Cl.
C01B 3/04 (2006.01)
C01B 6/06 (2006.01)
C01B 6/24 (2006.01)

(52) U.S. Cl. .............................. 423/658.2; 252/182.35; 423/645; 423/646; 423/647; 423/648.1

(58) Field of Classification Search ................. 423/644, 423/645, 646, 647, 648.1, 658.2; 252/182.35
See application file for complete search history.

(56) References Cited

U.S. PATENT DOCUMENTS

| | | | | |
|---|---|---|---|---|
| 3,816,192 A | * | 6/1974 | Brower et al. | ................ 423/644 |
| 3,819,808 A | * | 6/1974 | Mattson | ....................... 423/286 |
| 3,857,922 A | * | 12/1974 | Matzek et al. | .............. 423/275 |
| 4,200,624 A | | 4/1980 | Muller et al. | |
| 5,882,623 A | | 3/1999 | Zaluska et al. | |
| 6,106,801 A | | 8/2000 | Bogdanović et al. | |
| 6,228,338 B1 | | 5/2001 | Petrie et al. | ................. 423/265 |
| 6,231,636 B1 | | 5/2001 | Froes et al. | |
| 6,471,935 B2 | * | 10/2002 | Jensen et al. | ................ 423/646 |
| 6,726,892 B1 | | 4/2004 | Au | |
| 6,733,725 B2 | * | 5/2004 | Zaluska et al. | .............. 420/528 |
| 6,773,692 B2 | | 8/2004 | Pecharsky et al. | |
| 6,814,782 B2 | | 11/2004 | Bogdanović et al. | |
| 7,029,600 B2 | * | 4/2006 | Ovshinsky et al. | ..... 252/188.27 |
| 2001/0038821 A1 | | 11/2001 | Petrie et al. | ................. 423/645 |
| 2004/0247521 A1 | | 12/2004 | Bogdanovic et al. | |
| 2005/0002856 A1 | | 1/2005 | Zaluska et al. | |

FOREIGN PATENT DOCUMENTS

| | | |
|---|---|---|
| DE | 195 26 434 A1 | 1/1997 |
| WO | WO 99/24355 | 5/1999 |
| WO | WO 03/018468 A1 | 3/2003 |

OTHER PUBLICATIONS

Sinke, G.C, et al., *The Journal of Chemical Physics*, 47(8):2759-2761 (1967).

(Continued)

*Primary Examiner*—Wayne Langel
(74) *Attorney, Agent, or Firm*—Dorene M. Price

(57) ABSTRACT

In one aspect, the invention relates to activated aluminum hydride hydrogen storage compositions containing aluminum hydride in the presence of, or absence of, hydrogen desorption stimulants. The invention particularly relates to such compositions having one or more hydrogen desorption stimulants selected from metal hydrides and metal aluminum hydrides. In another aspect, the invention relates to methods for generating hydrogen from such hydrogen storage compositions.

47 Claims, 5 Drawing Sheets

Effect of LiH Doping on AlH$_3$ TPD

TPD Scan @ 2°C/min

OTHER PUBLICATIONS

Bower, F., et al., *Journal of the American Chemical Society*, 98:2450-2453 (1976).

Bogdanović, B., et al., *Journal of Alloys and Compounds*, 302: 36-58 (2000).

Ashby, E.C., *Adv. Inorg. Chem. and Radiochem.*, 8:283-335 (1966).

Balema, V. P., et al., *Chem. Commun.*, 1665-1666 (2000).

Baranowski, B., et al., *Zeitschrift für Physikalische Chemie Neue Folge*, 135: 27-38 (1983).

Bastide, J.P., et al., *Studies in Inorganic Chemistry*, 3: 785-787 (1983).

Bogdanović, B., et al., *MRS Bulletin*, 712-716 (2002).

Dymova, T.N., et al., *Russian Journal of Coordination Chemistry*, 21(3): 165-172 (1995).

Dymova, T.N., et al., *Russian Journal of Coordination Chemistry*, 25(5): 312-315 (1999).

Güther, V., *Journal of Alloys and Compounds*, 293-295: 889-892 (1999).

Jensen, C.M., et al., *International Journal of Hydrogen Energy*, 24: 461-465 (1999).

Ogden, J.M., et al., *Journal of Power Sources*, 79: 143-168 (1999).

Turley, J.W., et al., *Inorganic Chemistry*, 8(1): 18-22 (1969).

Zidan, R. A., et al., *Journal of Alloys and Compounds*, 285: 119-122 (1999).

Bogdanović, B., et al., *Journal of Alloys and Compounds*, 253-254: 1-9 (1997).

Sandrock, G., et al., *Appl. Phys. A*, 80:687-690 (2005).

Balema, V.P., et al., *Journal of Alloys and Compounds*, 313:69-74 (2000).

Wegrzyn, J., et al., DOE 2005 Hydrogen Program Annual Review, Washington, D.C., May 23, 2005.

Reilly, J.J., et al., IPHE International Hydgrogen Storage Technology Conference, Jun. 19-22, 2005, Lucca, Italy.

\* cited by examiner

ACTIVATED ALUMINUM HYDRIDE HYDROGEN STORAGE COMPOSITIONS AND USES THEREOF

This invention was made with Government support under contract number DE-AC02-98CH10886, awarded by the U.S. Department of Energy. The Government has certain rights in the invention.

The present invention relates to materials and methods directed to the controlled and efficient production of hydrogen gas. The invention particularly relates to activated aluminum hydride compositions and their use in the production of hydrogen gas.

BACKGROUND OF THE INVENTION

There is a strong and growing interest in the use of hydrogen as a next generation fuel. The main reason for this interest is that hydrogen is a very clean and non-polluting fuel which, when reacted with oxygen, gives off water as its only byproduct. Although elemental hydrogen does not naturally exist on the surface of the earth, it can be produced from a number of abundant materials such as water.

The generalized, widespread use of hydrogen as a fuel presents significant challenges primarily related to development of practical hydrogen storage methods and/or materials. For example, in the gaseous state, hydrogen is volumetrically impractical. Compressing or liquefying hydrogen as storage options is energetically impractical and highly pressurized tanks of a flammable gas mandate substantial safety considerations.

For these reasons, there has been much effort in making and studying materials which store hydrogen, e.g., solid hydride materials. For commercial viability, such solid hydride materials are preferably capable of storing at least 4.5% of hydrogen by weight.

Some hydride materials, such as magnesium hydride and aluminum hydride-based materials, have hydrogen storage capacities exceeding 4.5% by weight. However, prior to the innovations embodied in the present invention, such hydride materials have significant limitations in their commercial use. One of the greatest limitations has been that these materials are capable of releasing hydrogen only at temperatures exceeding 100° C. These high operating temperatures require inputs of energy which cause them to be of limited practical utility.

Accordingly, there has been an ongoing effort to find hydride materials which are capable of controllably releasing hydrogen without requiring substantial inputs of heat. For example, it would be highly advantageous for a hydrogen storage material having a high hydrogen content to controllably release hydrogen at temperatures at or below 100° C. Such lower temperatures are particularly advantageous since these temperatures are within some of the operating temperatures of proton exchange membrane (PEM) fuel cells, internal combustion engines, and similar devices.

It is known that alanes (e.g., aluminum hydride, $AlH_3$) and the complex aluminum hydrides (alanates such as $LiAlH_4$ and $NaAlH_4$) can be stimulated to desorb hydrogen at lower temperatures by processing in the presence of a metal catalyst (also referred to as dopants). The metal catalysts are typically transition metal-based materials. Among the most popular metal catalysts are those based on titanium, iron, cobalt, and nickel. The catalyst can be in the elemental form, or in the form of metal salts, such as $TiCl_3$, $TiCl_4$, $Ti(O-n-C_4H_9)_4$, $Fe(OC_2H_5)_2$, $Al_3Ti$, and the like. See, for example, U.S. Patent Application Publication No. 2004/0247521 A1 to Bogdanovic, et al., and U.S. Pat. No. 6,773,692 B2 to Pecharsky et al., the entire contents of which are incorporated herein by reference.

In Pecharsky, et al., hydrogen is extracted from solid hydrides during mechanical processing, preferably in the presence of stoichiometric and catalytic amounts of such transition metal catalysts, while Bogdanovic, et al. claim alkali metal alanate hydrogen storage materials that have been "doped" with such metal catalysts that are nanoparticulate, finely divided or have large specific surface areas.

There remains a need for practical hydrogen storage hydride compositions for low temperature production of hydrogen which do not require either simultaneous processing in the presence or absence of such metal catalysts or other dopants and/or which are not alkali metal alanates doped with such metal catalysts. The present invention relates to such compositions and uses thereof for the production of hydrogen.

SUMMARY OF THE INVENTION

The present invention relates to activated aluminum hydride hydrogen storage compositions and methods for desorbing hydrogen therefrom.

In one embodiment, the activated hydrogen storage composition comprises aluminum hydride in combination with sub-stoichiometric amounts (less than equimolar amounts) of stimulant. The stimulant preferably comprises: (i) one or more metal hydride compounds; (ii) one or more metal aluminum hydride compounds; or (iii) a combination of (i) and (ii).

In a preferred embodiment, the stimulant includes one or more alkali metal hydride compounds. Some examples of preferred alkali metal hydride compounds include lithium hydride, sodium hydride, and potassium hydride.

In another embodiment, the stimulant includes one or more metal aluminum hydride compounds. The metal aluminum hydride compounds can be represented by the formula:

$$M^2_x M^3_y (AlH_n)_z \qquad (2)$$

wherein $M^2$ represents one or a combination of monovalent metal atoms; $M^3$ represents one or a combination of divalent metal atoms; x and y independently represent 0 or a number greater than 0 and less than or equal to 3, provided that at least one of x and y is not zero; z is an integer from 1 to 9; and n is an integer from 4 to 6, provided that when n is 4, then z is equal to the sum of x and 2y; when n is 5, then 2z is equal to the sum of x and 2y; and when n is 6, then 3z is equal to the sum of x and 2y.

More preferably, in formula (2), $M^2$ represents one or a combination of alkali metal atoms and $M^3$ represents one or a combination of alkaline earth metal atoms.

In another embodiment, the metal aluminum hydride compounds are according to the formula:

$$M^4_r M^5_s AlH_n \qquad (3)$$

wherein $M^4$ and $M^5$ each independently represents an alkali metal atom; r and s independently represent 0 or a number greater than 0 and less than or equal to 3, provided that r and s are not both 0; and when neither r nor s is zero, then $M^4$ is not identical to $M^5$; n is an integer from 4 to 6, provided, when n is 4, the sum of r and s is one; when n is 5, the sum of r and s is 2; and when n is 6, the sum of r and s is 3.

A preferred embodiment of the metal aluminum hydrides of formula (3) is represented in (4):

$$M^4_{3-r} M^5_r AlH_6 \qquad (4)$$

wherein $M^4$ and $M^5$ each independently represents an alkali metal atom selected from lithium, sodium, and potassium; and r represents 0 or a number greater than 0 and less than or equal to 3.

Some examples of preferred metal aluminum hydride compounds according to formula (4) include $Li_3AlH_6$, $Li_2NaAlH_6$, $LiNa_2AlH_6$, $Na_3AlH_6$, $Li_2KAlH_6$, $LiK_2AlH_6$, $Na_2KAlH_6$, $NaK_2AlH_6$, and $K_3AlH_6$.

Another preferred embodiment of the metal aluminum hydride compounds of formula (3) are the metal aluminum hydrides according to formula (6):

$$M^4_{1-r}M^5_rAlH_4 \quad (6)$$

wherein $M^4$ and $M^5$ each independently represents an alkali metal atom selected from lithium, sodium, and potassium; and r represents 0 or a number greater than 0 and less than or equal to 1.

Some examples of preferred metal aluminum hydride compounds according to formula (6) include $LiAlH_4$, $NaAlH_4$, and $KAlH_4$.

In another embodiment, the metal aluminum hydride compounds are according to the formula:

$$M^6_{3-r}M^7_r(AlH_6)_2 \quad (7)$$

wherein $M^6$ and $M^7$ each independently represents an alkaline earth metal atom; and r represents 0 or a number greater than 0 and less than or equal to 3.

A preferred embodiment of the metal aluminum hydride compounds of formula (7) are those according to formula (8):

$$M^6_{1-r}M^7_r(AlH_4)_2 \quad (8)$$

wherein $M^6$ and $M^7$ each independently represents an alkaline earth metal atom; and r represents 0 or a number greater than 0 and less than or equal to 1.

In formula (7) and (8), $M^6$ and $M^7$ are more preferably selected from the group consisting of calcium, magnesium and strontium.

In the activated aluminum hydride hydrogen storage compositions of the present invention, the stimulant:aluminum hydride molecular ratio is less than 1:1 (i.e., the stimulant is present in sub-stoichiometric amounts relative to aluminum hydride). Preferably, the stimulant:aluminum hydride molecular ratio is 1:1.5 or less. In a particularly preferred embodiment, the stimulant:aluminum hydride molecular ratio is approximately 1:3 to 1:9 in the activated aluminum hydride compositions. Expressed alternatively, the total molar amount of stimulant comprises less than fifty (50) percent of the combined molar amounts of aluminum hydride plus stimulant. Preferably, the molar amount of stimulant comprises approximately twenty-five percent or less of the combined molar amounts of aluminum hydride plus stimulant. In a particularly preferred embodiment, the molar amount of stimulant comprises approximately ten percent to twenty percent of the combined molar amounts of aluminum hydride plus stimulant.

The activated hydrogen storage compositions can further include one or more metal-containing catalysts. Under suitable conditions, the metal-containing catalysts are capable of aiding desorption of hydrogen from the hydrogen storage compositions.

The metal-containing catalyst contains one or more metals which are capable of aiding desorption of hydrogen from an aluminum hydride material. The one or more metals in the metal-containing catalysts are more preferably transition metals. Such transition metal catalysts are preferably either: (i) one or a combination of transition metals in elemental form; (ii) main group-transition metal compositions; (iii) transition metal salts; (iv) transition metal complexes; or (v) any suitable combinations thereof.

For example, the one or more transition metal catalysts can be selected from the class of transition metal borides, aluminides, carbides, silicides, nitrides, oxides, sulfides, fluorides, chlorides, bromides, and iodides.

Preferably, the one or more transition metal catalysts are based on transition metals selected from the group consisting of titanium, zirconium, nickel, cobalt, and iron.

The activated aluminum hydride hydrogen storage compositions described herein above can be additionally activated by mechanically processing the compositions. In one embodiment of the present invention, the method of forming the activated aluminum hydride compositions includes one or a combination of mechanical processes including mixing, grinding or milling processes. Some preferred mechanical processes include manual mixing, mechanically assisted mixing, ball milling, manual grinding, attritor milling, sand milling, horizontal milling, vertical milling, jet milling, jaw crusher milling, hammer milling, and high pressure dispersion milling.

The hydrogen desorption characteristics of the activated aluminum hydride hydrogen storage compositions described herein above have been examined in some detail as described by Sandrock, et al., Appl. Phys. A 80:687-690, (2005), the entire contents of which are incorporated herein by reference.

In another embodiment, the activated aluminum hydride hydrogen storage composition is a modified aluminum hydride comprised of one or more specific crystalline phases of aluminum hydride. The recognized crystalline phases of aluminum hydride include the alpha, alpha prime, beta, gamma, delta, epsilon, and zeta phases. In such hydrogen storage compositions, one specific crystalline phase of aluminum hydride may be present as more than fifty (50) percent of the total aluminum hydride of the composition. In preferred compositions one specific phase may be present as more than eighty (80) percent of the total aluminum hydride of the composition.

Particularly preferred are freshly made crystalline phases of aluminum hydride. Even more preferred are such phases of aluminum hydride which have been purified by preparation in a reduced oxygen, oxygen-free, low humidity, or zero humidity environment.

In a preferred embodiment, the purified specific phases of aluminum hydride are capable of efficient hydrogen production under suitable conditions in the absence of a stimulant or catalyst. In a further preferred embodiment, the purified specific phases of aluminum hydride can be additionally activated by mild mechanical processing. Such preferred compositions are capable of efficient hydrogen desorption under controlled conditions, which may include the application of thermal stimulation.

In a further embodiment, the activated aluminum hydride composition includes one or more purified specific phases of aluminum hydride in the presence of any one or more of the hydrogen-desorption stimulants or catalysts described above.

The invention is also directed to methods for generating hydrogen gas from the activated aluminum hydride compositions described above. In one embodiment, the method of hydrogen desorption includes exposing the activated aluminum hydride composition to heat. In a preferred embodiment, the heat can be extracted from the surroundings (ambient conditions). In a particularly preferred embodiment, the heat is waste heat generated by a device in operation.

Some suitable approximate temperature ranges include, for example, −100° C. to approximately +200° C., +25° C. to approximately +150° C., and +25° C. to approximately +125° C.

More preferably, the method of hydrogen desorption is also capable of sustained hydrogen production.

The activated aluminum hydride compositions of the present invention represent hydrogen storage materials having high hydrogen storage capacities and improved desorption kinetics. Such compositions are of practical importance for the ever expanding technologies that require gaseous hydrogen as a fuel.

DETAILED DESCRIPTION OF THE INVENTION

Figure 1:
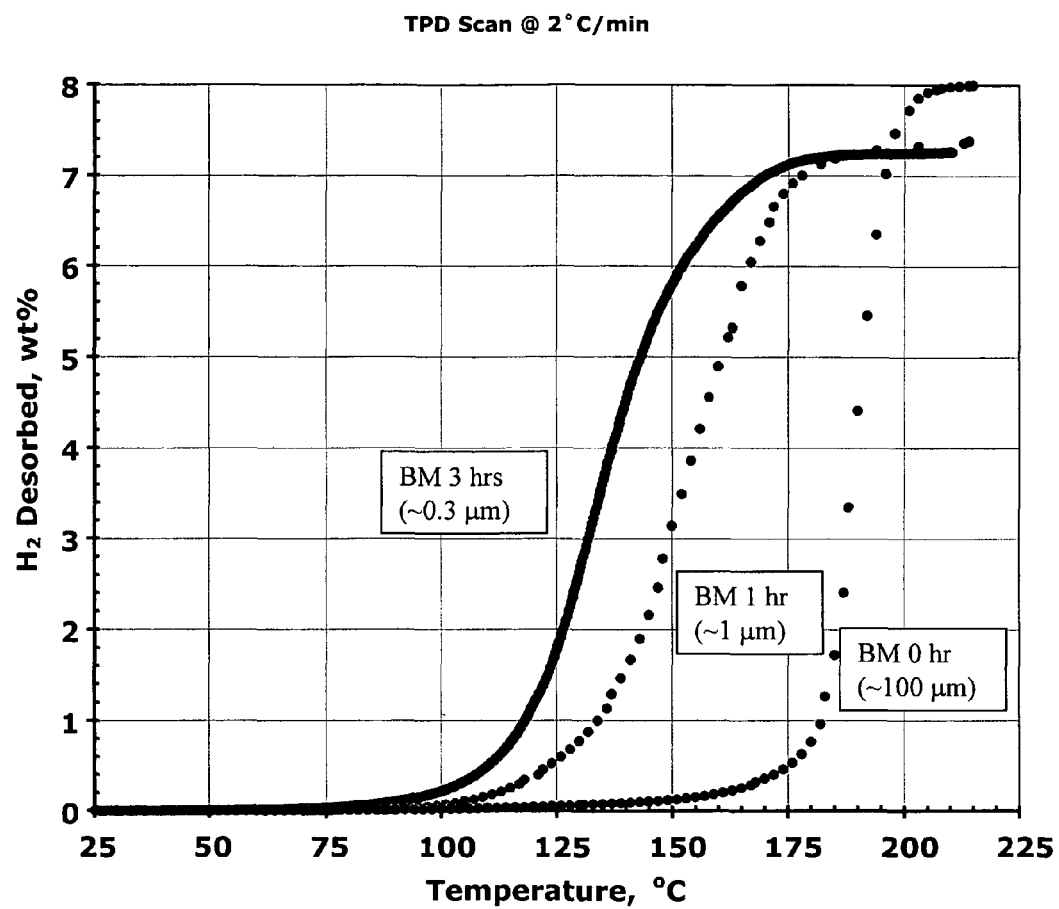
FIG. 1. Effect of ball-milling time (and particle size) on temperature programmed desorption (TPD) scans of aluminum hydride ($AlH_3$) at a scan rate of 2° C. per minute.

In one aspect, the invention relates to hydrogen storage compositions containing aluminum hydride. The term "aluminum hydride" refers primarily to the class of aluminum hydride compositions encompassed by the formula:

$$(AlH_n)_z \quad (1)$$

In formula (1), n and z are independently any suitable non-zero integer or fractional number. For example, n can be a number from approximately 1 to 3. Some examples of suitable values for n include 0.8, 0.9, 1.0, 1.2, 1.5, 1.8, 2.0, 2.2, 2.5, 2.8, 2.9, 3.0, 3.1, 3.2, and 3.3.

When z in formula (1) is 1, the aluminum hydride is non-polymeric. When z is greater than one, the aluminum hydride is multimeric, oligomeric, or polymeric. For example, a multimer results when z has a value of, for example, less than 20 (e.g., 2, 3, 4, 5, 10). An oligomer or polymer results when z has a value of 20 or over (e.g., 20, 30, 40, 50, 100, 200, 500, 1000, 10,000, and higher values).

Most notable of the aluminum hydride compositions is alane, $AlH_3$, wherein n and z in formula (1) are 3 and 1, respectively. Alane is known to exist in several crystalline phases, all of which are suitable for the invention. For example, alane is known to exist either in an amorphous state, or in the alpha (α), alpha prime (α'), beta (β), gamma (γ), delta (δ), or zeta (ζ) phases. Alane can also exist in varying weight percentages of the foregoing crystalline phases or in combinations of the phases. See, for example, F. M. Brower, et al., (1976) *Journal of the American Chemical Society*, 98 (9), pp. 2450-2453.

The aluminum hydride used in the invention can have any acceptable purity level. Preferably for fuel cell applications, the aluminum hydride is free of organic contaminants. For example, the aluminum hydride is preferably non-adducted and non-solvated by organic species.

The hydrogen storage compositions of the present invention can also have a number of applications other than fuel cells. For some of these other applications, e.g., as catalysts, chemical reactants, and so on, the aluminum hydride may contain organic species. For example, the aluminum hydride may be adducted with such chemicals as dimethylethylamine, triethylenediamine (TEDA), N,N',N'',N'''-tetramethylethylene-diamine (TMEDA), or 1, 2-bis(diphenylphosphino)ethane (DPPE). The aluminum hydride can also be solvated with an organic solvent such as tetrahydrofuran (THF), diethyl ether, diglyme, or ethylene glycol dimethyl ether.

For applications other than fuel cells, the aluminum hydride can also be, or include, aluminum hydride compounds having organic functional groups. Some examples of such aluminum hydride compounds include methyl aluminum hydride, ethyl aluminum hydride, dimethyl aluminum hydride, and diisobutyl aluminum hydride (DIBAL-H). The aluminum hydride can also have additional inorganic groups, such as halo groups (e.g., $AlClH_2$ and $AlF_2H$).

The aluminum hydride can be completely composed (i.e., 100% by weight) of any of the aluminum hydride compositions described above. Alternatively, the aluminum hydride can include another compound or material which is not a hydride.

For example, for some applications the aluminum hydride can be desirably diluted with one or more inert materials. Some examples of inert materials include silicon oxide and aluminum oxide. Such inert materials can be included in an amount of, for example, one, five, ten, twenty, fifty, sixty, seventy, eighty, or ninety percent by weight.

The aluminum hydride can also be in any suitable physical form. For example, the aluminum hydride can be in particulate form, e.g., powder, crystalline, polycrystalline, microcrystalline, pelletized, granular, and so on.

The size of the aluminum hydride particles is not particularly critical to the operability of the present invention. For example, any one or more dimensions of the particles can be one centimeter or less, 50 millimeters or less, 40 millimeters or less, 30 millimeters or less, 20 millimeters or less, 10 millimeters or less, 1 millimeter or less, 500 microns or less, 250 microns or less, 100 microns or less, 50 microns or less, 20 microns or less, 10 microns or less, 1 micron or less, 500 nanometers or less, 250 nanometers or less, 100 nanometers or less, 50 nanometers or less, and so on. In preferred embodiments, the aluminum hydride is composed of particles of 1 to 250 microns or 50 to 100 microns.

The particles of aluminum hydride can also have any of several morphologies. For example, the particles can be approximately spherical, oblong, rectangular, square planar, trigonal bipyramidal, cylindrical, octahedral, cubooctahedral, icosahedral, rhombohedral, rod-shaped, cuboidal, pyramidal, amorphous, and so on.

Alternatively, the aluminum hydride can be in non-particulate form, e.g., in block form, in sheet form, as a coating, a film, an interconnected or interwoven network, or a combination thereof.

The activated aluminum hydride hydrogen storage compositions of the present invention are capable of efficiently producing hydrogen gas under suitable conditions. The term "efficiently" refers to a rate of hydrogen production which, under a specific set of hydrogen desorption conditions, is greater than the rate of hydrogen production from non-activated aluminum hydride compositions. More preferably, the rate of hydrogen production is sufficient for supplying a hydrogen-fueled device, such as a hydrogen-powered fuel cell or internal combustion engine.

More preferably, the hydrogen storage composition is capable of efficiently and controllably producing hydrogen for a sustained period of time. For example, for fuel cell applications, it would be particularly preferred for the hydrogen storage composition to be capable of releasing adequate levels of hydrogen at a steady rate for a period of several hours or days. For applications where hydrogen demand varies with time, it is possible and preferable to vary the hydrogen desorption rate by varying the temperature.

In a preferred embodiment, the aluminum hydride is in a modified form. The modified form can be, for example, a purified form in which the aluminum hydride was prepared and maintained (stored) in a reduced oxygen, oxygen-free, low humidity, zero humidity environment. Such purified forms of aluminum hydride also contain low levels of impurities.

Or, the modified form can be, for example, a specific crystalline phase or mixture of specific phases of aluminum hydride. For example, the aluminum hydride can be partially, or wholly, enriched in one or more of the crystalline phase. The crystalline phases can be present in amounts of, for example, one, five, ten, twenty, fifty, sixty, seventy, eighty, ninety, ninety-five, and higher weight percents, of the total amount of aluminum hydride.

In a particularly preferred embodiment, the modified aluminum hydride is a purified aluminum hydride composed completely of one or more crystalline phases.

In a preferred embodiment, the purified crystalline aluminum hydride is composed completely of the alpha, alpha prime, beta, gamma, delta, epsilon, or zeta phases, or alternatively, combinations thereof (e.g., a combination of beta and gamma, alpha and beta, and alpha and gamma). In a preferred embodiment, the purified aluminum hydride contains a beta or gamma crystalline phase of $AlH_3$.

The aluminum hydride can also be in a modified form by having been freshly made. By "freshly made" is meant a sample of aluminum hydride which has been made more recently than the aged batch of $AlH_3$ from Dow Chemical Co., as described in the examples below, before use. For example, a batch of aluminum hydride could be freshly made by having been synthesized a few years ago, a year ago, or months ago.

In a preferred embodiment, the aluminum hydride is freshly made within the last six months, and even more preferably in the last three months. In other embodiments, the aluminum hydride is freshly made within a month, a week, a few days, twenty four hours, a few hours, one hour, or even minutes.

The aluminum hydride can also be in a modified form by having been prepared and maintained (stored) under special conditions. Preferably, the modified form of aluminum hydride is made and stored in a reduced oxygen, oxygen-free, low humidity, or zero humidity environment.

In a preferred embodiment, the modified forms of aluminum hydride comprise activated hydrogen storage compositions which are capable of efficient hydrogen production under suitable conditions without the aid of a stimulant or catalyst. In a further embodiment, the modified forms of aluminum hydride comprise an activated hydrogen storage composition without the aid of mechanical processing, such as ball milling. Efficient hydrogen desorption can result simply from standing at or exposure to a suitable temperature, which temperature may be the ambient conditions. The rate of hydrogen desorption for such modified forms of aluminum hydride can be altered or adjusted by, for example, varying the surrounding or exposure temperature.

In another embodiment, any of the activated hydrogen storage compositions described above (i.e., modified or unmodified aluminum hydride) further includes one or more hydrogen-desorption stimulants in sub-stoichiometric amounts relative to the aluminum hydride (i.e., the stimulant: aluminum hydride molecular ratio is less than 1:1). The stimulant causes an increase in hydrogen desorption from the aluminum hydride as compared to the hydrogen desorption in the absence of the stimulant.

In a first embodiment, the hydrogen-desorption stimulant is comprised of one or more metal hydride compounds. The metal hydride compounds are preferably represented by the formula MH where M is any suitable monovalent metal atom. More preferably, M is an alkali metal.

Some examples of suitable alkali metal hydride stimulants include lithium hydride (LiH), sodium hydride (NaH), potassium hydride (KH), and combinations thereof.

Other suitable metal hydride stimulants include those according to the formula $M^1H_2$, wherein $M^1$ is a divalent metal atom. More preferably, $M^1$ is an alkaline earth metal atom. Some examples of suitable alkaline earth metal hydride compounds include magnesium hydride ($MgH_2$), calcium hydride ($CaH_2$), strontium hydride ($SrH_2$), and combinations thereof.

The metal hydride stimulant can also be, or include, one or more transition metal, rare earth, or main group metal hydride. Some examples of such metal hydrides include zirconium hydride ($ZrH_2$), titanium hydride ($TiH_2$), lanthanum pentanickel hydride ($LaNi_5H_6$), niobium hydride (e.g., NbH, $NbH_{0.78}$, $NbH_{0.86}$), vanadium hydride ($VH_2$), magnesium nickel hydride ($Mg_2NiH_4$), iron titanium hydride (e.g., $FeTiH_2$, $FeTiH_{1.9}$, $FeTiH_{1.7}$), sodium borohydride ($NaBH_4$), and combinations thereof.

In a second embodiment, the hydrogen-desorption stimulant is comprised of one or more metal aluminum hydride compounds. The metal aluminum hydride compounds are any compounds having at least one anionic aluminum hydride moiety ($AlH_n$) associated with one or a combination of metal atoms. The anionic aluminum hydride moiety can have n of 4 (i.e., $AlH_4^{1-}$), n of 5 (i.e., $AlH_5^{2-}$), or n of 6 (i.e., $AlH_6^{3-}$). The one or more metal atoms associated with the anionic aluminum hydride moiety can be selected from the alkali, alkaline earth, main group, transition, or lanthanide metals.

In a more specific embodiment, the one or more metal aluminum hydride compounds can be represented by the formula (2):

$$M^2_x M^3_y (AlH_n)_z \qquad (2)$$

In formula (2), $M^2$ represents one or a combination of monovalent metal atoms and $M^3$ represents one or a combination of divalent metal atoms.

In formula (2), the subscripts x and y independently represent 0 or a number greater than 0 and less than or equal to 3, provided that at least one of x and y is not zero. The subscript z is preferably an integer from 1 to 9, more preferably 1 to 6. The subscript n is preferably an integer from 4 to 6, more preferably an integer of 4 or 6. When n is 4, then z is equal to the sum of x and 2y; when n is 5, then 2z is equal to the sum of x and 2y; and when n is 6, then 3z is equal to the sum of x and 2y.

In a preferred embodiment, the one or more metal aluminum hydride stimulants of formula (2) are alkali metal aluminum hydride compounds, i.e., when $M^2$ in formula (2) represents one or more alkali metal atoms and y is zero. Some examples of suitable monovalent alkali metal atoms include $Li^{+1}$, $Na^{+1}$, and $K^{+1}$.

Such alkali metal aluminum hydride compounds can be represented by the formula:

$$M^4{}_rM^5{}_sAlH_n \quad (3)$$

In formula (3), $M^4$ and $M^5$ each independently represents an alkali metal atom. The subscripts r and s independently represent 0, or a number greater than 0 and less than or equal to 3, provided that r and s are not both 0. When r and s are each other than zero, then $M^4$ represents an alkali metal atom which is different than the alkali metal atom of $M^5$. The subscript n is an integer from 4 to 6, provided that when n is 4, the sum of r and s is one, when n is 5, the sum of r and s is 2, and when n is 6, the sum of r and s is 3.

When n in formula (3) is 6, the formula represents the class of hexahydrido alkali metal aluminum hydride compounds. The hexahydrido alkali metal aluminum hydride compounds can be represented by the formula (4):

$$M^4{}_{3-r}M^5{}_rAlH_6 \quad (4)$$

In formula (4), $M^4$ and $M^5$ are preferably independently selected from lithium, sodium, and potassium. The subscript r in formula (4) represents 0 or a number greater than 0 and less than or equal to 3.

When $M^4$ and $M^5$ are selected from lithium and sodium, formula (4) reduces to formula (5):

$$Li_{3-r}Na_rAlH_6 \quad (5)$$

Some examples of suitable compounds within the scope of formula (5) include $Li_3AlH_6$, $Na_3AlH_6$, $Li_{2.5}Na_{0.5}AlH_6$, $Li_2NaAlH_6$, $Li_{1.5}Na_{1.5}AlH_6$, $LiNa_2AlH_6$, and $Li_{0.5}Na_{2.5}AlH_6$.

When $M^4$ and $M^5$ are selected from lithium and potassium, formula (4) reduces to formula (5a):

$$Li_{3-r}K_rAlH_6 \quad (5a)$$

Some examples of suitable compounds within the scope of formula (5a) include $K_3AlH_6$, $Li_{2.5}K_{0.5}AlH_6$, $Li_2KAlH_6$, $Li_{1.5}K_{1.5}AlH_6$, $LiK_2AlH_6$, and $Li_{0.5}K_{2.5}AlH_6$.

When $M^4$ and $M^5$ are selected from sodium and potassium, formula (4) reduces to formula (5b):

$$Na_{3-r}K_rAlH_6 \quad (5b)$$

Some examples of suitable compounds within the scope of formula (5b) include $Na_{2.5}K_{0.5}AlH_6$, $Na_2KAlH_6$, $Na_{1.5}K_{1.5}AlH_6$, $NaK_2AlH_6$, and $Na_{0.5}K_{2.5}AlH_6$.

When n in formula (3) is 4, the formula represents the class of tetrahydrido alkali metal aluminum hydride compounds. The tetrahydrido alkali metal aluminum hydride compounds can be represented by the formula (6):

$$M^4{}_{1-r}M^5{}_rAlH_4 \quad (6)$$

In formula (6), $M^4$ and $M^5$ are preferably independently selected from lithium, sodium, and potassium. The subscript r represents 0 or a number greater than 0 and less than or equal to 1.

When $M^4$ and $M^5$ in formula (6) are selected from lithium and sodium, formula (6) reduces to formula (6a):

$$Li_{1-r}Na_rAlH_4 \quad (6a)$$

Some examples of suitable compounds within the scope of formula (6a) include $LiAlH_4$, $NaAlH_4$, $Li_{0.1}Na_{0.9}AlH_4$, $Li_{0.2}Na_{0.8}AlH_4$, $Li_{0.4}Na_{0.6}AlH_4$, $Li_{0.5}Na_{0.5}AlH_4$, $Li_{0.6}Na_{0.4}AlH_4$, $Li_{0.8}Na_{0.2}AlH_4$, and $Li_{0.9}Na_{0.1}AlH_4$.

When $M^4$ and $M^5$ in formula (6) are selected from lithium and potassium, formula (6) reduces to formula (6b):

$$Li_{1-r}K_rAlH_4 \quad (6b)$$

Some examples of suitable compounds within the scope of formula (6b) include $KAlH_4$, $Li_{0.1}K_{0.9}AlH_4$, $Li_{0.2}K_{0.8}AlH_4$, $Li_{0.4}K_{0.6}AlH_4$, $Li_{0.5}K_{0.5}AlH_4$, $Li_{0.6}K_{0.4}AlH_4$, $Li_{0.8}K_{0.2}AlH_4$, and $Li_{0.9}K_{0.1}AlH_4$.

When $M^4$ and $M^5$ in formula (6) are selected from sodium and potassium, formula (6) reduces to formula (6c):

$$Na_{1-r}K_rAlH_4 \quad (6c)$$

Some examples of suitable compounds within the scope of formula (6b) include $Na_{1.0}K_{0.9}AlH_4$, $Na_{0.2}K_{0.8}AlH_4$, $Na_{0.4}K_{0.6}AlH_4$, $Na_{0.5}K_{0.5}AlH_4$, $Na_{0.6}K_{0.4}AlH_4$, $Na_{0.8}K_{0.2}AlH_4$, and $Na_{0.9}K_{0.1}AlH_4$.

In another embodiment, the one or more metal aluminum hydride stimulants are alkaline earth metal aluminum hydride compounds, i.e., when $M^3$ in formula (2) represents one or more alkaline earth metal atoms and x is zero. Some examples of suitable divalent alkaline earth metal atoms include $Mg^{2+}$, $Ca^{2+}$, and $Sr^{2+}$.

Such alkaline earth metal aluminum hydride compounds can be represented by the formula:

$$M^6{}_rM^7{}_s(AlH_n)_z \quad (7a)$$

In formula (7a), $M^6$ and $M^7$ each independently represents one or more alkaline earth metal atoms. The subscripts r and s independently represent 0 or a number greater than 0 and less than or equal to 3, provided that r and s are not both 0. When neither r nor s is zero, $M^6$ is not identical to $M^7$. The subscripts n and z are as defined above under formula (2).

When n in formula (7a) is 6, the formula represents the class of hexahydrido alkaline earth metal aluminum hydride compounds. The hexahydrido alkaline earth metal aluminum hydride compounds can be represented by the formula (7):

$$M^6{}_{3-r}M^7{}_r(AlH_6)_2 \quad (7)$$

In formula (7), $M^6$ and $M^7$ each independently represents an alkaline earth metal atom. More preferably, $M^6$ and $M^7$ are selected from calcium, magnesium, and strontium. The subscript r represents 0 or a number greater than 0 and less than or equal to 3.

Some examples of suitable stimulant compounds within the scope of formulas (7) and (7a) include $Mg_3(AlH_6)_2$, $Ca_3(AlH_6)_2$, $CaMg_2(AlH_6)_2$, $Ca_{0.5}Mg_{2.5}(AlH_6)_2$, $Ca_{1.5}(AlH_6)_2$, $Ca_2Mg(AlH_6)_2$, $Ca_{2.5}Mg_{0.5}(AlH_6)_2$, and $CaMgSr(AlH_6)_2$.

When n in formula (7a) is 4, the formula represents the class of tetrahydrido alkaline earth metal aluminum hydride compounds. The tetrahydrido alkaline earth metal aluminum hydride compounds can be represented by the formula:

$$M^6{}_{1-r}M^7{}_r(AlH_4)_2 \quad (8)$$

In formula (8), $M^6$ and $M^7$ each independently represents an alkaline earth metal atom. The subscript r represents 0 or a number greater than 0 and less than or equal to 1.

Some examples of suitable compounds within the scope of formula (8) include $Mg(AlH_4)_2$, $Ca(AlH_4)_2$, $Sr(AlH_4)_2$, $Ca_{0.5}Sr_{0.5}(AlH_4)_2$, and $Mg_{0.5}Ca_{0.5}(AlH_4)_2$.

In another embodiment, the one or more metal aluminum hydride stimulant compounds contain a combination of an alkali metal and an alkaline earth metal, i.e., when $M^2$ in formula (2) represents one or more alkali metal atoms and $M^3$ represents one or more alkaline earth metal atoms. Some suitable examples of such metal aluminum hydride stimulant compounds include $LiMg(AlH_4)_3$, $NaMg(AlH_4)_3$, $KMg(AlH_4)_3$, $LiCa(AlH_4)_3$, $NaCa(AlH_4)_3$, $KCa(AlH_4)_3$, $Li[Mg_3(AlH_4)_7]$, $Na[Mg_3(AlH_4)_7]$, $K[Mg_3(AlH_4)_7]$, $Li[Ca_3(AlH_4)_7]$, $Na[Ca_3(AlH_4)_7]$, $K[Ca_3(AlH_4)_7]$, $Li_3[Mg_3(AlH_4)_9]$, $LiMg(AlH_6)$, $NaMg(AlH_6)$, $KMg(AlH_6)$, $LiCa(AlH_6)$, $NaCa(AlH_6)$, $KCa(AlH_6)$, $LiSr(AlH_6)$, $NaSr(AlH_6)$, $Li_4[Ca(AlH_6)_2]$, $Li_5[Mg_2(AlH_6)_3]$, $Na_5[Mg_3(AlH_6)_3]$, $Li_6[Mg_3(AlH_6)_4]$, and $Li_2[Mg_5(AlH_6)_4]$.

In another embodiment, the hydrogen-desorption stimulant is composed of a combination of any two or more of the stimulant compounds described above. Some examples of suitable combinations include LiH and $LiAlH_4$; NaH and $LiAlH_4$; KH and $LiAlH_4$; LiH and $NaAlH_4$; NaH and $NaAlH_4$; $Na_2LiAlH_6$ and LiH; LiH and $Mg(AlH_4)_2$; LiH and $Mn(AlH_4)_2$; LiH, NaH, and $LiAlH_4$; LiH, $LiAlH_4$, and $NaAlH_4$; $LiAlH_4$ and $MgH_2$; and $LiAlH_4$ and $TiH_2$.

The hydrogen-desorption stimulant described above functions to stimulate hydrogen desorption from aluminum hydride rather than reacting quantitatively with the aluminum hydride. A quantitative reaction would require a stoichiometric, 1:1 (50%:50%) molar ratio of stimulant to aluminum hydride.

The stimulants described above are present in a sub-stoichiometric amount (i.e., a less than equimolar amount) with respect to aluminum hydride. A substoichiometric amount of the stimulant is a molar amount which is less than fifty (<50) percent of the combined molar amounts of aluminum hydride plus stimulant. Preferably, the molar amount of stimulant is a maximum amount of approximately forty percent (40%), more preferably approximately thirty percent (30%), and even more preferably approximately twenty percent (20%) of the combined molar amounts of aluminum hydride plus stimulant. Depending on the application and various other factors, including desired rate of hydrogen production, cost, efficiency, and so on, the maximum amount of stimulant can be desirably less than 20% of the combined molar amounts of aluminum hydride plus stimulant. For example, the stimulant can be in a maximum amount of approximately 15%, 10%, 5%, 2%, or 1%. If desired, the amount of stimulant can also be less than one percent.

Such stimulant amounts correspond to stimulant:aluminum hydride molecular ratios of less than 1:1, i.e., <1 stimulant:1 aluminum hydride or 1 stimulant: >1 aluminum hydride. In a particularly preferred embodiment, the stimulant:aluminum hydride ratio is approximately 1:3 to 1:9 in the activated aluminum hydride compositions.

Preferably, the stimulant:aluminum hydride molecular ratio is 1:1.5 or less, more preferably 1:2 or less, and more preferably approximately 1:3 or less and even more preferably 1:4 or less. Depending on the application and various other factors, including desired rate of hydrogen production, cost, efficiency, and so on, the maximum ratio of stimulant: aluminum hydride can be desirably less than 1:4. For example, the stimulant:aluminum hydride ratio can be a maximum of approximately 1:5.5, 1:9, 1:19, 1:49, 1:99, or less. If desired, the amount of stimulant can also be less than one percent of the amount of aluminum hydride.

There is no required minimum amount of stimulant. However, in some embodiments, a minimum amount of stimulant is desirable. For example, the moles of stimulant can be in a minimum amount of 40%, 30%, 20%, 15%, 10%, 5%, 1%, 0.5%, 0.1%, 0.05%, or 0.01% percent of the combined molar amounts of aluminum hydride plus stimulant in the hydrogen storage composition.

The molar amount of stimulant can also be in any suitable range. The range is preferably limited within any combination of maximum and minimum amounts described above. For example, the molar amount of stimulant can be in a range of <50% to 1%, <50% to 10%, <50% to 20%, <50% to 30%, 40% to 1%, 40% to 10%, 40% to 20%, 40% to 30%, 30% to 1%, 30% to 10%, 30% to 20%, 20% to 1%, 20% to 10%, 15% to 1%, 15% to 5%, 10% to 0.1%, 10% to 1%, 5% to 1%, 2% to 1%, 5% to 0.1%, 2% to 0.1%, 1% to 0.1%, and of the combined molar amounts of aluminum hydride plus stimulant.

The activated aluminum hydride hydrogen storage compositions described above can include any one or more metal-containing catalysts capable of aiding desorption of hydrogen under suitable conditions from the hydrogen storage composition. The metal-containing catalyst contains any suitable one or combination of metals. Some examples of suitable classes of metals for the metal-containing catalyst include the alkali, alkaline earth, main group, transition, lanthanide, and actinide classes of metals.

In one embodiment, the metal-containing catalyst (variously, dopant) includes one or more metals in elemental form. For example, the metal-containing catalyst can include one, or an unalloyed combination of, elemental metals selected from the main group and transition classes of metals.

The main group metals include the elements of groups IIIA to VIIA of the Periodic Table. Some examples of elemental main group metals suitable for the metal-containing catalyst include boron (B), aluminum (Al), carbon (C), silicon (Si), and sulfur (S).

The transition metals include the elements having atomic numbers 21-30 (the first row of transition metals), atomic numbers 39-48 (the second row of transition metals), and atomic numbers 72-80 (the third row of transition metals). Some examples of elemental transition metals suitable for the metal-containing catalyst include titanium (Ti), vanadium (V), chromium (Cr), manganese (Mn), iron (Fe), cobalt (Co), nickel (Ni), and copper (Cu). Particularly preferred are metal-containing catalysts containing elemental titanium, zirconium, nickel, cobalt, iron, and combinations thereof.

In another embodiment, the metal-containing catalyst is an alloy of two or more metals, i.e., an alloy catalyst. The metals in the alloy can be selected from, for example, the alkali, alkaline earth, main group, and transition classes of metals. The alloy can be, for example, a homogeneous or heterogeneous alloy.

For example, the alloy catalyst can include a suitable alloy of two or more main group elements. Some examples of such alloy catalysts include boron nitride, boron carbide, boron trioxide, borax (e.g., $Na_2B_4O_7$), boric acid, aluminum carbide, aluminum diboride, aluminum nitride, aluminum oxide, aluminum sulfide, lithium aluminate, sodium aluminate, barium aluminate, magnesium aluminate, silicon oxide, silicon nitride, silicon carbide, and silicon tetraboride.

Of particular relevance are alloy catalysts having a main group-(non-main group) metal composition. For example, the alloy catalyst can include one or a combination of main group elements in combination with one or a combination of alkali, alkaline earth, and transition, metals.

In a preferred embodiment, the alloy catalysts include one or more main group metals in combination with one or more transition metals. Such alloy catalysts have a main group-transition metal composition. For example, the metal-containing catalyst can be a boride, aluminide, carbide, silicide, nitride, oxide, sulfide, selenide, or any suitable combination thereof, of one or more transition metals.

In a preferred embodiment, the one or more transition metals in the main group-transition metal catalyst compositions described above are selected from titanium, zirconium, nickel, cobalt, and iron.

Some examples of titanium alloy compositions suitable as catalysts include TiAl, $TiAl_3$, $Ti_3Al$, $Ti_2O_3$, TiN, $TiH_2$, TiC, $TiB_2$, $TiSi_2$, and $TiS_2$.

Some examples of zirconium alloy compositions suitable as catalysts include $ZrAl_3$, $ZrO_2$, $ZrO_2 \cdot MgO$, $ZrO_2 \cdot CaO$, $ZrN$, $ZrH_2$, $ZrC$, $ZrB_2$, $ZrS_2$, and $ZrSi_2$.

Some examples of nickel alloy compositions suitable as catalysts include $NiAl$, $NiO$, $Ni_2O_3$, $NiC$, $NiB$, $NiS$, and $NiSi_2$.

An example of a cobalt alloy composition suitable as a catalyst includes $CoO$.

Some examples of iron alloy compositions suitable as catalysts include $FeO$, $Fe_2O_3$, $Fe_3C$, $Fe_2B$, $Fe_3N$, $FeAl$, and $FeSi$.

In another embodiment, the metal-containing catalysts include one or more metal salts. The metal salts include one or more metal atoms associated with one or more halide or complex anions. The complex anions can be singly negatively charged, doubly negatively charged, triply negatively charged, and more highly charged. Some examples of suitable anions include fluoride, chloride, bromide, iodide, sulfate, methanesulfonate, trifluoromethanesulfonate, sulfite, nitrate, nitrite, phosphate, phosphite, hypophosphite, carbonate, chlorate, perchlorate, iodate, oxalate, acetate, borate, metaborate, tetraborate, tungstate, molybdate, silicate, orthosilicate, titanate, cobaltate, vanadate, zirconate, niobate, chromate, and cuprate.

Particularly preferred for the metal-containing catalysts are the transition metal salts. The transition metal salts are composed of one or a combination of suitable transition metal atoms associated with one or a combination of halide or complex anions. More preferably, the transition metals in such catalysts are selected from titanium, zirconium, nickel, cobalt, and iron.

Some examples of transition metal salts suitable as metal-containing catalysts include $TiF_4$, $TiCl_3$, $TiCl_4$, $TiBr_4$, $Ti(NO_3)_4$, $Ti_2(SO_4)_3$, $ZrF_4$, $ZrCl_4$, $ZrBr_4$, $ZrI_4$, $ZrSiO_4$, $Zr(SO_4)_2$, $ZrO(NO_3)_2$, $NiF_2$, $NiCl_2$, $NiBr_2$, $NiI_2$, $NiMoO_4$, $Ni(NO_3)_2$, $NiSO_4$, $Ni(BF_4)_2$, $NiTiO_3$, $CoF_2$, $CoCl_2$, $CoBr_2$, $CoI_2$, $CoCO_3$, $Co(NO_3)_2$, $Co_3(PO_4)_2$, $CoSO_4$, $Co(SCN)_2$, $FeF_3$, $FeCl_2$, $FeCl_3$, $FeBr_3$, $FeI_2$, $FeI_3$, $Fe(NO_3)_3$, $FePO_4$, $FeSO_4$, $Fe(BF_4)_2$, and $FeTiO_3$. A particularly preferred metal salt is $TiCl_3$.

In another embodiment, the metal-containing catalysts include one or more metal complexes. The metal complexes contain one or more metal atoms bound to, or associated with, one or more metal-bonding ligands. Many of the metal-bonding ligands have an organic (i.e., carbon-based) framework and are capable of chelating the metal atom. Some well-known classes of metal-bonding ligands include the alkoxides, carboxylates, and amines.

Some examples of suitable alkoxide ligands include methoxide, ethoxide, isopropoxide, butoxide, isobutoxide, phenoxide, 2,4,6-trimethylphenoxide, catecholate, ethylene glycolate, pentane-2,4-dioate, 2,2,6,6-tetramethyl-3,5-heptanedioate.

Some examples of suitable carboxylate ligands include formate, acetate, propionate, butyrate, isobutyrate, pentanoate, tartrate, citrate, oxalate, malonate, succinate, glutarate, 1,6-hexanedioate, fumarate, suberate, terephthalate, and phthalate.

Some suitable classes of amine ligands include the nitrogen-containing rings, trialkylamines, and the diamines. Some specific examples of amine ligands include pyridine, 2,2'-bipyridine, terpyridine (2,2';6'2"-terpyridine), piperidine, pyrrole, pyrazole, pyrrolidine, pyrimidine, imidazole, trimethylamine, triethylamine, triisopropylamine, ethylenediamine, ethylenediaminetetraacetic acid (EDTA), and tris-(pyrazolyl)borate.

Some examples of main group metal complexes suitable as metal-containing catalysts include boron tris(trifluoroacetate), borane-trimethylamine complex, aluminum phenoxide, and aluminum acetylacetonate.

Some examples of transition metal complexes suitable as metal-containing catalysts include titanium tetrahydrofurfuryloxide, zirconium acetate, zirconium acetylacetonate, vanadyl acetylacetonate, cobalt acetate, cobalt acetylacetonate, cobalt phthalocyanine, cobalt tris-(2,2,6,6-tetramethyl-3,5-heptanedioate), nickel acetate, nickel acetylacetonate, nickel bis-(2,2,6,6-tetramethyl-3,5-heptanedioate), nickel cyclohexanebutyrate, nickel 2-ethylhexanoate, nickel hexafluoroacetylacetonate, nickel oxalate, iron acetate, iron acetylacetonate, iron citrate, iron gluconate, and iron oxalate.

In another embodiment, the metal-containing catalyst is a combination of any of the catalysts thus far described. For example, the catalyst can be one or more elemental metals in combination with one or more metal alloys; one or more elemental metals in combination with one or more metal salts; one or more elemental metals in combination with one or metal complexes; one or more metal alloys in combination with one or more metal salts; one or more metal alloys in combination with one or more metal complexes; or one or more metal salts in combination with one or more metal complexes.

The metal-containing catalyst can be included in any suitable amount in the hydrogen storage composition. Preferably, the metal-containing catalyst is included in an amount of less than twenty mole percent (<20%) of the hydrogen storage composition. More preferably, the metal-containing catalyst is included in an amount of less than fifteen mole percent, and even more preferably less than ten mole percent. For example, some suitable amounts of the metal-containing catalyst include 0.5%, 1%, 2%, 3%, 4%, or 5% of the hydrogen storage composition.

The hydrogen storage compositions described above can include any additional materials so desired. The additional materials may serve, for example, as auxiliary agents. Such auxiliary agents can be used to enhance, optimize, or modify performance of the hydrogen storage material.

The one or more auxiliary agents can be, for example, alkali metal salts. Some examples of alkali metal salts include lithium aluminate, lithium carbonate, lithium hexafluoroarsenate, lithium phosphate, lithium hexafluorophosphate, lithium iodate, lithium metaborate, lithium nitrate, lithium orthosilicate, lithium perchlorate, lithium tetraborate, lithium tetrafluoroborate, sodium metabisulfite, and sodium metasilicate.

The one or more auxiliary agents can also be, for example, main group metal salts. Some examples of main group metal salts include boron trifluoride, boron trichloride, boron tribromide, aluminum fluoride, aluminum chloride, aluminum bromide, aluminum iodide, aluminum nitrate, aluminum sulfate, aluminum phosphate, aluminum potassium sulfate, aluminum silicate, aluminum titanate (e.g., $Al_2O_3 \cdot TiO_2$), aluminum titanium chloride, and aluminum trifluoromethanesulfonate.

The one or more auxiliary agents can also be a combination of any of the auxiliary agents described above. For example, the auxiliary agent can be a combination of an alkali metal salt and an alkaline earth metal salt, an alkali metal salt and a main group metal salt, an alkali metal salt and a rare earth salt, an alkaline earth metal salt and a main group metal salt, an alkaline earth metal salt and a rare earth salt, or a main group metal salt and a rare earth salt.

In another aspect, the invention relates to methods for generating hydrogen gas by treating the hydrogen storage composition described above. The method includes treating an aluminum hydride hydrogen storage composition by a mechanical process. For some applications, the mechanical process serves simply to agitate or stir the hydrogen storage composition. In a preferred embodiment, the mechanical process reduces the size of the particles in the hydrogen storage composition.

Mechanical processes which reduce particle size include, for example, one or a combination of mixing, grinding or milling processes. The mixing and grinding processes can be manual or mechanically assisted.

The milling process can be any one or combination of milling processes known in the art. For example, the milling process can include media made of granular material (i.e., media milling). Some examples of suitable media milling processes include ball milling, attritor milling, sand milling, horizontal milling, and vertical milling.

Alternatively, the milling process can be medialess. Some examples of suitable medialess milling processes include jet milling, jaw crusher milling, hammer milling, and high pressure dispersion milling.

A particularly preferred mechanical process is ball milling. In the ball milling process, balls or beads of an inert material are mixed with particles of an aluminum hydride hydrogen storage composition. The mixture is then preferably agitated mechanically at a desirable frequency. The beads are preferably composed of sand, steel (e.g., stainless steel), alumina, or zirconia. The size of the beads are preferably within the range of 1 mm to 10 cm. More preferably, the size of the beads is in the range of 1 mm to 50 mm, and even more preferably 5 mm to 20 mm.

The mechanical process is applied for a desirable or suitable period of time. The mechanical process to provide additionally activated compositions is preferably applied as a precursor step to the process of generating hydrogen. The period of time for which the mechanical process is applied can vary considerably depending on the application as well as other processing conditions.

In a preferred embodiment of the method, a particulate form of the hydrogen storage composition is ball milled under conditions which provide for optimal activation of the aluminum hydride hydrogen storage composition. For example, the hydrogen storage composition may be ball milled for thirty minutes, one hour, two hours, or three hours.

In another embodiment, the method includes treating the hydrogen storage composition by a non-mechanical process. The non-mechanical process can employ a radiative or non-radiative energy source. Some examples of radiative energy sources include microwaves, ultraviolet light, x-rays, and gamma rays. Other radiative energy sources can be in the form of particle bombardment, such as electron or neutron bombardment. An example of a non-radiative energy source is ultrasound, and particularly high frequency ultrasound.

Another aspect of the invention relates to methods of generating hydrogen gas from the activated aluminum hydride compositions. A particularly preferred method is the exposure of the hydrogen storage composition to heat. For example, heat can be specifically generated for the process and applied to the activated hydrogen storage material. Alternatively, the heat can be passively generated, e.g., as a byproduct or as waste heat generated by a device in operation. In a preferred embodiment, the heat is waste heat generated by a fuel cell device or an automotive combustion engine or heat from the surroundings (ambient conditions).

In some embodiments, the temperature used in the process can be a minimum of, for example, −150° C., −125° C., −100° C., −80° C., −75° C., −50° C., −25° C., −15° C., −10° C., −5° C., 0° C., +5° C., +10° C., +15° C., +20° C., +25° C., +30° C., +40° C., +50° C., +60° C., +70° C., +75° C., or +80° C., and a maximum of, for example, +85° C., +90° C., +95° C., +100° C., +115° C., +120° C., +125° C., +130° C., +140° C., +150° C., +160° C., +170° C., +180° C., +190° C., +200° C., +210° C., +220° C., +230° C., +240° C., or +250° C.

In other embodiments, the temperature used in the process can be a minimum of, for example, −150° C., −125° C., −100° C., −80° C., −75° C., −50° C., −25° C., −15° C., −10° C., −5° C., 0° C., +5° C., +10° C., +15° C. +20° C., +25° C., or +30° C., and a maximum of, for example, +40° C., +50° C., +60° C., +70° C., +75° C., or +80° C.

In yet other embodiments, the temperature used in the process can be a minimum of, for example, −150° C., −125° C., −100° C., −80° C., −75° C., −50° C., −25° C., −15° C., −10° C., −5° C., 0° C., +5° C., +10° C., +15° C., or +20° C., and a maximum of, for example, +25° C., +30° C., or there between.

Any suitable range of temperatures can be used in the process. The range is preferably limited within any combination of maximum and minimum amounts described above.

Examples have been set forth below for the purpose of illustration and to describe the best mode of the invention at the present time. However, the scope of this invention is not to be in any way limited by the examples set forth herein.

EXAMPLES

Example 1

Procedures

In certain experiments, $AlH_3$ samples were subjected to particle size reduction using a high energy planetary ball milling (Fritsch Pulverisette 6 at 200 RPM), using a 250 cm³ stainless steel vial, seven 15 mm diameter balls and 1.5 g samples (64:1 ball:powder ratio, by mass). In cases where a stimulant was introduced, it was mixed with the $AlH_3$ sample in the planetary mill. The ball mill vial is equipped with a pressure transducer and thermometer, which allow instantaneous radio transmission of pressure and temperature data during milling. Samples were evaluated by two means: 1) Temperature programmed desorption (TPD), whereby the sample being tested is heated at a constant rate (2° C./m) and the desorbed $H_2$ collected in a previously evacuated calibrated volume. 2) The sample was decomposed at a constant temperature and the evolved hydrogen gas was collected in the calibrated volume. In both cases the final pressure in the calibrated volume was about 60 kPa. The sample reactor was a 13 mm diameter stainless steel tube (electrically heated by wrapped resistive tape) containing a Type K thermocouple in the center of the sample bed. Arrhenius kinetic analysis was done using a stepped temperature technique (see G. Sandrock, et al., *J. Alloys Compd.*, 339, 299 (2002)). Ball milled sample particle sizes were roughly estimated from scanning electron microscope (SEM) examination. X-ray diffraction (XRD) studies were performed on as-ball-milled, partially desorbed and fully desorbed samples.

Example 2

Effect of Ball-Milling Time (and Particle Size) on Hydrogen Desorption from Aged α $AlH_3$ In this experiment the sample was the a (trigonal/rhombohedral, R3c) phase of $AlH_3$ made by Dow Chemical Co. in 1975 from $LiAlH_4$ and $AlCl_3$ by a wet (ether solvent) chemical process. It is the same batch used in the 1980 kinetic studies of Herley et al. See F. M. Brower, et al., *J. Am. Chem.*

Soc., 98, 2450 (1976); A. E. Finholt, et al., *J. Am. Chem. Soc.*, 62 (1947); P. J. Herley, et al., *J. Phys. Chem.*, 85, 1874 (1981); P. J. Herley, et al., *J. Solid State Chem.*, 35, 391 (1980).

The above form of $AlH_3$ was found to be very stable and virtually solvent free. When it was received more than a quarter-century ago, it contained 8.3 wt % hydrogen, i.e., somewhat lower than the 10.1 wt % expected of pure $AlH_3$. However, in an impressive testimony to its shelf life in air, the hydride still contains 8.0 wt % hydrogen. The sample consists of translucent, approximately 50-100 μm cuboidal particles. Particle-size reduction was accomplished by high energy planetary ball milling. After milling the samples were removed from the sealed vial inside a drybox to prevent contact with air and introduced into a 13-mm-diameter stainless steel reactor which was then sealed. The reactor was removed from the drybox and attached to an experimental apparatus to carry out the TPD determination.

FIG. 1 shows the TPD curves for as-received (~100 μm), 1 hour BM (~1 μm) and 3 hour BM (~0.3 μm) $AlH_3$ powder. It is clear that particle-size reduction lowers the desorption-temperature range. Whereas the as-received $AlH_3$ powder desorbs in the temperature range of 175-200° C., one hour of ball milling reduces the temperature range to 125-175° C. The levels of desorbed hydrogen shown in FIG. 1 (7-8 wt %) are impressive and are better than any of the previously known, easily reversible, hydrides at <200° C. Because the first hour of BM is reasonably effective, this period was used for all subsequent ball mill experiments.

Example 3

Effect of Metal Hydride Stimulants on Hydrogen Generation from Aged α $AlH_3$

Figure 2:
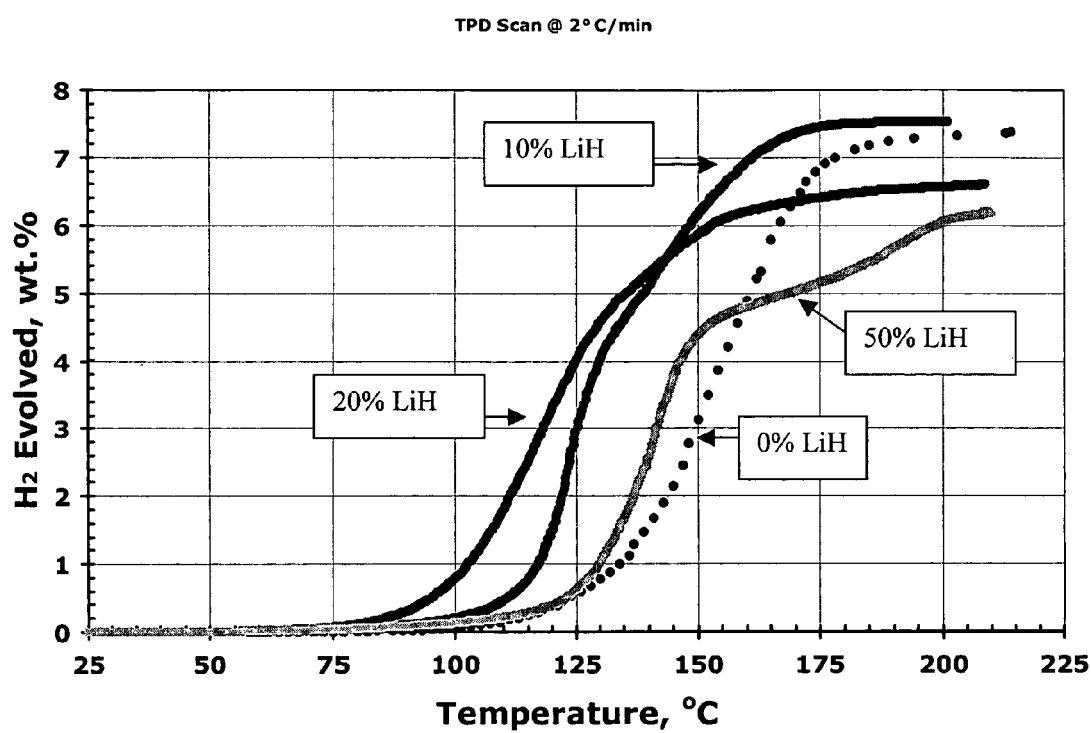
FIG. 2. Effect of LiH doping on the TPD scans of one-hour ball-milled $AlH_3$—LiH mixtures at a scan rate of 2° C. per minute. LiH levels expressed in mole percent.

In this experiment, aged α $AlH_3$ was ball milled with 0, 10, 20 and 50 mole percent LiH stimulant (stimulant:aluminum hydride molecular ratio=0, 1:9, 1:4, and 1:1, respectively; molar amount of stimulant=0%, 10%, 20% and 50% of the combined molar amounts of aluminum hydride plus stimulant, respectively). FIG. 2 shows the effects of the addition of 10-50 mole percent LiH to $AlH_3$ on the TPD curves. The desorption temperatures of the 10 and 20% LiH stimulated samples were reduced 40-50° C. compared to the ball milled metal hydride-free $AlH_3$ sample. The 20% LiH sample even shows significant desorption starting below 100° C., albeit at an ultimate capacity of less than 7 wt %. This series of experimental results indicate that a ball milled mixture of $AlH_3$ and LiH (at 10 to 20% mole percent) provides an excellent activated aluminum hydride hydrogen storage composition whereas a stoichiometric mixture of 50 mole percent $AlH_3$ and 50 mole percent LiH does not.

X-ray diffraction (XRD) studies indicate that small quantities of fine alanate particles form during ball milling (e.g., $LiAlH_4$ in the LiH case, or $NaAlH_4$ and $KAlH_4$ in the NaH and KH cases). Accordingly, while not wishing to be held to any particular theory as to the mechanism that results in improved desorption characteristics, a likely mechanism of the stimulation provided by sub-stoichiometric amounts of metal hydride stimulant appears to be the formation of surface layers or islands of alanate species which serve as 'windows' for hydrogen egress from the decomposing $AlH_3$.

Example 4

Isothermal Desorption Kinetics of Aged α $AlH_3$

Figure 3:
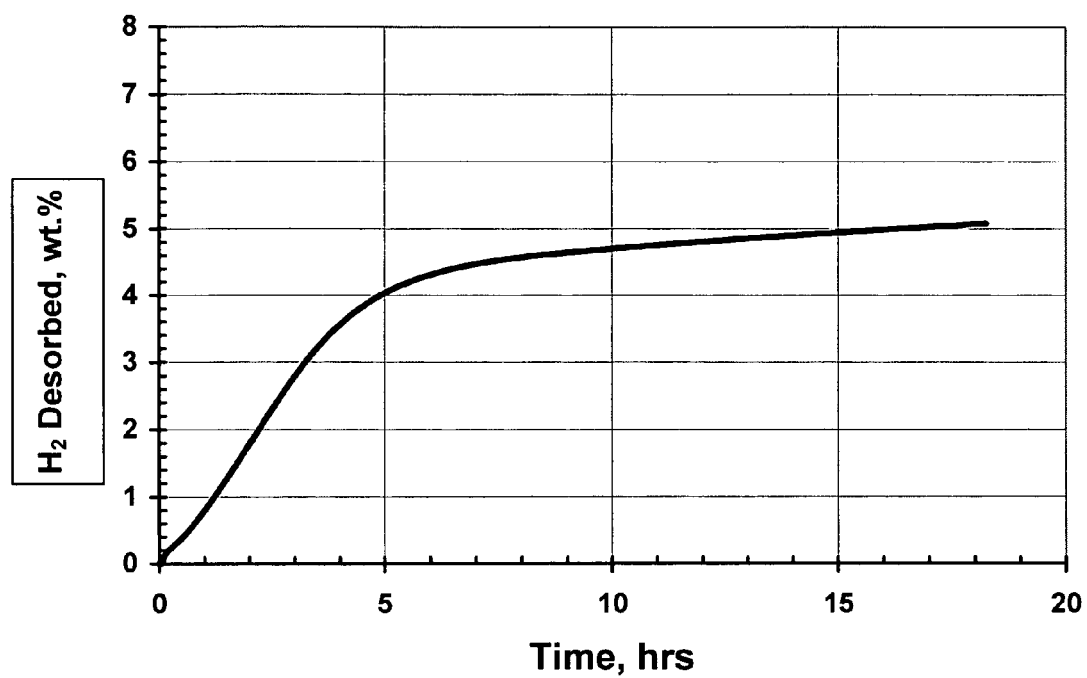
FIG. 3. 100° C. isothermal desorption curve of an 80 mole % $AlH_3$-20 mole % LiH composition (molecular ratio of stimulant:aluminum hydride=1:4; molar amount of LiH is 20% of the combined molar amounts of $AlH_3$ plus LiH).

Characterization of the kinetics of hydrogen desorption from the hydrogen storage material can be determined from isothermal desorption studies. FIG. 3 shows 100° C. isothermal desorption curves for a ball milled sample consisting of 80% $AlH_3$-20% LiH composition. As implied by the curve, there are two desorption stages: relatively rapid kinetics for the first four hours (about 4 wt % $H_2$) and then significantly lower kinetics after a short transition period.

Figure 4:
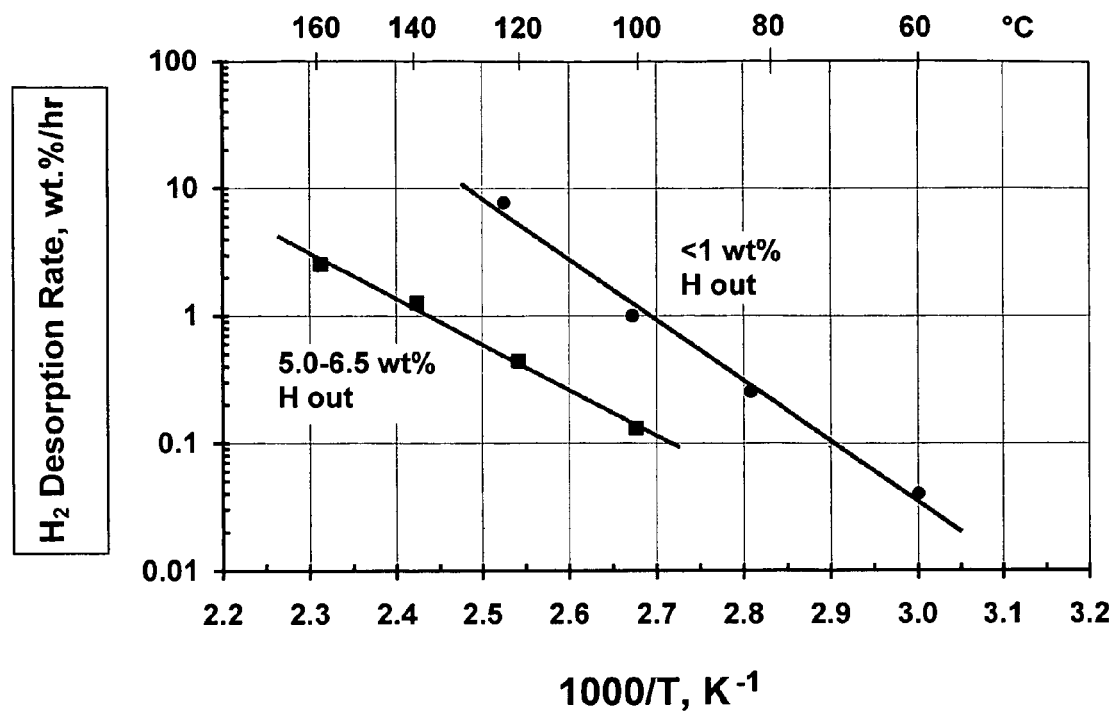
FIG. 4. Arrhenius desorption plots of the 80 mole % $AlH_3$-20 mole % LiH composition for the high-rate and low-rate segments of FIG. 3.

The temperature dependences of both stages were determined and the results are shown in FIG. 4 as Arrhenius plots of rate (on a logarithmic scale) vs. reciprocal absolute temperature. The exponential fit of the rate data show that the desorption kinetics of both stages follow thermally activated behavior of the form rate=$k_0$ exp (-Q/RT), where the rate is in wt %/h, $k_0$ is the rate constant, Q is the thermal activation energy (J/mol $H_2$), R is the gas constant (8.315 J $mol^{-1}K^{-1}$) and T is absolute temperature (K). For the high-rate segment, $k_0$ can be calculated as $6.5 \times 10^{12}$ and Q as 91.3 kJ/mol $H_2$. For the low-rate segment, $k_0$ can be calculated as $5.4 \times 10^8$ and Q as 68.2 kJ/mol $H_2$.

FIG. 4, and the related rate equation above, offer a convenient basis to judge the desorption kinetics of 80% $AlH_3$-20% LiH relative to vehicle-supply requirements. If we have an 8-10 wt % H-storage medium and assume a five-hour driving time, then we need desorption rates on the order of 1.6-2 wt %/hr. From FIG. 4, 2 wt %/hr would require about 107° C. for the initial (0-3.5 wt %) portion of the decomposition curve and about 151° C. for the low-rate (>4 wt %) portion. Thus, the initial part of the $AlH_3$ desorption curve comes close to vehicle requirements if we have 100° C. waste heat available for decomposition.

Example 5

Isothermal Desorption Kinetics of Freshly Synthesized α and β $AlH_3$

In this experiment, the decomposition kinetics of freshly synthesized α $AlH_3$ and β $AlH_3$ were determined at 100° C. The decomposition of the fresh materials was compared to the decomposition kinetics of the aged α $AlH_3$, which was carried out at 158° C. None of the samples were subjected ball milling and no stimulant, catalyst nor dopant was added to the samples. The freshly prepared alpha and beta phases of $AlH_3$ were synthesized using a slightly modified procedure of Brower et al. (See F. M. Brower, et al., *J. Am. Chem. Soc.*, 98, 2450 (1976). Both of the freshly made phases were prepared in an inert atmosphere, dry box, and hence, protected from oxygen and humidity.

Figure 5:
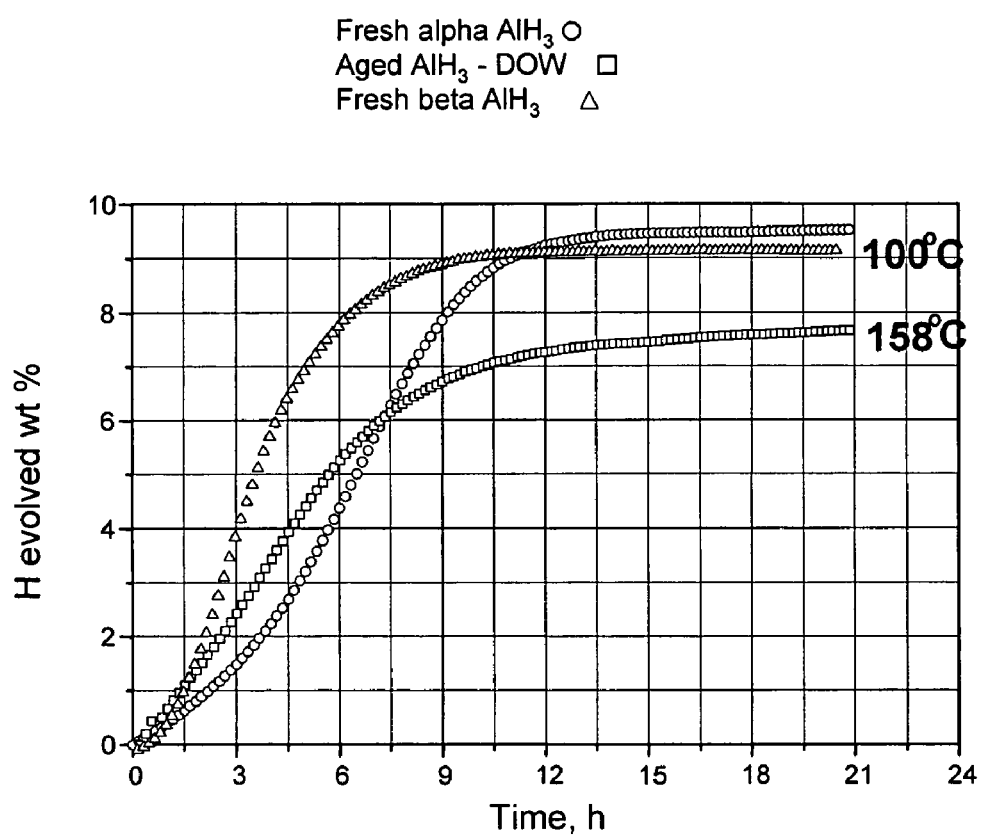
FIG. 5. Hydrogen desorption characteristics of aged alpha-$AlH_3$ and freshly made, purified alpha $AlH_3$ and freshly made, purified beta-$AlH_3$.

The plots shown in FIG. 5 demonstrate that both the fresh alpha and beta phases are significantly more reactive than the aged alpha (Dow) material. Surprisingly, the fresh beta phase shows considerably better kinetics than the fresh alpha phase, illustrating that the various $AlH_3$ phases have somewhat different properties and likely have greater or lesser applicability to their use as hydrogen storage compositions. The kinetics of isothermal decomposition of the freshly made $AlH_3$ phases, in the absence of stimulants such as alkali metal hydrides, indicate that the freshly made, purified phases of $AlH_3$ are useful activated aluminum hydride hydrogen storage materials. Further, it is likely that by the addition of stimulants and/or by modifying synthesis procedures that the hydrogen desorption properties of freshly made $AlH_3$ phases can be modified in desirable directions, e.g. lower temperature, better kinetics, safer handling characteristics and possibly easier regeneration of spent $AlH_3$.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. An activated aluminum hydride hydrogen storage composition comprising aluminum hydride in combination with a hydrogen-desorption stimulant comprised of: (i) one or more metal hydride compounds; (ii) one or more metal aluminum hydride compounds; or (iii) a combination of (i) and (ii); and wherein said stimulant is present in a molar amount of less than fifty percent of the combined molar amounts of aluminum hydride plus stimulant.

2. The activated hydrogen storage composition according to claim 1 wherein activation is further provided by mechanical processing of the composition.

3. The composition according to claim 2 wherein mechanical processing comprises one or more mixing, grinding or milling processes.

4. The hydrogen storage composition according to claim 1, further comprising one or more metal-containing catalysts capable of aiding desorption of hydrogen from said hydrogen storage composition.

5. The hydrogen storage composition according to claim 4, wherein said one or more metal-containing catalysts are one or more transition metal catalysts selected from the group consisting of (i) one or a combination of transition metals in elemental form; (ii) main group-transition compositions; (iii) transition metal salts; (iv) transition metal complexes; and (v) any combination thereof.

6. The hydrogen storage composition according to claim 5, wherein said one or more transition metal catalysts are selected from the group consisting of transition metal borides, aluminides, carbides, silicides, fluorides, chlorides, bromides, and iodides.

7. The hydrogen storage composition according to claim 6, wherein said one or more transition metal catalysts are based on transition metals selected from the group consisting of titanium, zirconium, nickel, cobalt, and iron.

8. The hydrogen storage composition according to claim 1, wherein said one or more metal hydride compounds are alkali metal hydride compounds.

9. The hydrogen storage composition according to claim 8, wherein said one or more metal hydride compounds are selected from the group consisting of lithium hydride, sodium hydride, and potassium hydride.

10. The hydrogen storage composition according to claim 1, wherein said one or more metal aluminum hydride compounds are according to the formula

$$M^2_x M^3_y (AlH_n)_z \qquad (2)$$

wherein $M^2$ represents one or a combination of monovalent metal atoms; $M^3$ represents one or a combination of divalent metal atoms; x and y independently represent 0 or a number greater than 0 and less than or equal to 3, provided that at least one of x and y is not zero; z is an integer from 1 to 9; and n is an integer from 4 to 6, provided that when n is 4, then z is equal to the sum of x and 2y; when n is 5, then 2z is equal to the sum of x and 2y; and when n is 6, then 3z is equal to the sum of x and 2y.

11. The hydrogen storage composition according to claim 10, wherein $M^2$ represents one or a combination of alkali metal atoms and $M^3$ represents one or a combination of alkaline earth metal atoms.

12. The hydrogen storage composition according to claim 11, wherein said one or more metal aluminum hydride compounds are according to the formula:

$$M^4_r M^5_s AlH_n \qquad (3)$$

wherein $M^4$ and $M^5$ each independently represents an alkali metal atom; r and s independently represent 0 or a number greater than 0 and less than or equal to 3, provided that r and s are not both 0, and when neither r nor s is zero, then $M^4$ is not identical to $M^5$; n is an integer from 4 to 6, provided that when n is 4, the sum of r and s is one, when n is 5, the sum of r and s is 2, and when n is 6, the sum of r and s is 3.

13. The hydrogen storage composition according to claim 12, wherein said one or more metal aluminum hydride compounds are according to the formula:

$$M^4_{3-r} M^5_r AlH_6 \qquad (4)$$

wherein $M^4$ and $M^5$ each independently represents an alkali metal atom selected from the group consisting of lithium, sodium, and potassium; and r represents 0 or a number greater than 0 and less than or equal to 3.

14. The hydrogen storage composition according to claim 13, wherein said one or more metal aluminum hydride compounds are selected from the group consisting of $Li_3AlH_6$, of $Li_2NaAlH_6$, $LiNa_2AlH_6$, $Na_3AlH_6$, $Li_2KAlH_6$, $LiK_2AlH_6$, $Na_2KAlH_6$, $NaK_2AlH_6$, and $K_3AlH_6$.

15. The hydrogen storage composition according to claim 12, wherein said one or more metal aluminum hydride compounds are according to the formula

$$M^4_{1-r} M^5_r AlH_4 \qquad (6)$$

wherein $M^4$ and $M^5$ each independently represents an alkali metal atom selected from the group consisting of lithium, sodium, and potassium; and r represents 0 or a number greater than 0 and less than or equal to 1.

16. The hydrogen storage composition according to claim 15, wherein said one or more metal aluminum hydride compounds are selected from the group consisting of $LiAlH_4$, $NaAlH_4$, and $KAlH_4$.

17. The hydrogen storage composition according to claim 1, wherein said aluminum hydride is selected from the group consisting of alpha-phase, alpha prime-phase, beta-phase, gamma-phase, delta-phase, epsilon-phase, zeta-phase, and combinations thereof, of aluminum hydride.

18. The hydrogen storage composition according to claim 17, wherein said aluminum hydride is in a crystalline or microcrystalline form.

19. The hydrogen storage composition according to claim 1, wherein said stimulant is present in a molar amount of less than or equal to forty percent of the combined molar amounts of aluminum hydride plus stimulant.

20. The hydrogen storage composition according to claim 19, wherein said stimulant is present in a molar amount of less than or equal to twenty-five percent of the combined molar amounts of aluminum hydride plus stimulant.

21. The hydrogen storage composition according to claim 20, wherein said stimulant is present in a molar amount of less than or equal to twenty percent of the combined molar amounts of aluminum hydride plus stimulant.

22. The hydrogen storage composition according to claim 21, wherein said stimulant is present in a molar amount of less than or equal to ten percent of the combined molar amounts of aluminum hydride plus stimulant.

23. The hydrogen storage composition according to claim 22, wherein said stimulant is present in a molar amount of less than or equal to five percent of the combined molar amounts of aluminum hydride plus stimulant.

24. The hydrogen storage composition according to claim 23, wherein said stimulant is present in a molar amount of less than or equal to one percent of the combined molar amounts of aluminum hydride plus stimulant.

25. The hydrogen storage composition according to claim 20, wherein said stimulant is present in a molar amount in the range of less than or equal to ten to twenty-five percent of the combined molar amounts of aluminum hydride plus stimulant.

26. A method for generating hydrogen gas, the method comprising treating an activated aluminum hydride hydrogen storage composition according to a process capable of desorbing hydrogen gas from said hydrogen storage composition, said hydrogen storage composition comprising aluminum hydride in combination with a hydrogen-desorption stimulant comprised of: (i) one or more metal hydride compounds; (ii) one or more metal aluminum hydride compounds; or (iii) a combination of (i) and (ii); and wherein said stimulant is present in a molar amount of less than fifty percent of the combined molar amounts of aluminum hydride plus stimulant.

27. The method according to claim 26, wherein said hydrogen storage composition further comprises one or more metal-containing catalysts capable of aiding desorption of hydrogen from said hydrogen storage composition.

28. The method according to Claim 26 wherein the one or more metal hydride compounds are alkali metal hydride compounds; and wherein the one or more metal aluminum hydride compounds are according to the formula $$M^2_x M^3_y (AlH_n)_z \qquad (2)$$

wherein $M^2$ represents one or a combination of alkali metal atoms; $M^3$ represents one or a combination of alkaline earth metal atoms; x and y independently represent 0 or a number greater than 0 and less than or equal to 3, provided that at least one of x and y is not zero; z is an integer from 1 to 9; and n is an integer from 4 to 6, provided that when n is 4, then z is equal to the sum of x and 2y; when n is 5, then 2z is equal to the sum of x and 2y; and when n is 6, then 3z is equal to the sum of x and 2y.

29. The method according to claim 26, wherein said hydrogen storage composition has been treated by a mechanical process.

30. The method according to claim 29, wherein said mechanical process comprises one or more mixing, grinding or milling processes.

31. The method according to claim 26, wherein said process comprises exposing the hydrogen storage composition to heat.

32. The method according to claim 31, wherein said heat is waste heat generated by a device in operation.

33. The method according to claim 26, wherein said process comprises a combination of a mechanical process and the application of heat.

34. The method according to claim 26, wherein said process comprises exposure of the composition to ambient conditions.

35. The method according to claim 26, wherein said process comprises exposure of the composition to a temperature range of approximately −100° C. to approximately +200° C.

36. The method according to claim 35, wherein said temperature range is approximately +25° C. to approximately +150° C.

37. The method according to claim 36, wherein said temperature range is approximately +80° C. to approximately +125° C.

38. The method according to Claim 34 wherein the ambient conditions provide for sustained hydrogen production.

39. The method according to Claim 38 wherein the ambient conditions are in a temperature range between approximately 0° C. and +125° C.

40. The method according to Claim 39 wherein the stimulant is present in an molar amount of less than or equal to 25 percent.

41. The method according to Claim 40 wherein the stimulant is present in a molar amount of approximately 1 percent to 10 percent.

42. The method according to Claim 26 wherein said aluminum hydride is in a crystalline or microcrystalline form.

43. The method according to Claim 26 wherein said aluminum hydride is selected from the group consisting of alpha-phase, alpha prime-phase, beta-phase, gamma-phase, delta-phase, epsilon-phase, zeta-phase, and combinations thereof, of aluminum hydride.

44. The composition according to claim 1, wherein the aluminum hydride is in particulate form.

45. The compositions according to claim 44, wherein the aluminum hydride in particulate form is in powder, crystalline, polycrystalline, microcrystalline, palletized, or granular form.

46. The composition according to claim 44, wherein the aluminum hydride particles are from 1 to 250 microns in size.

47. The composition according to claim 44, wherein the aluminum hydride particles are from 50 to 100 microns in size.

* * * * *